(12) United States Patent
Mikliaev

(10) Patent No.: US 8,270,084 B2
(45) Date of Patent: Sep. 18, 2012

(54) DEVICE FOR BEAM SHAPING

(75) Inventor: Iouri Mikliaev, Cheljabinsk (RU)

(73) Assignee: LIMO Patentverwaltung GmbH & Co. KG, Gerstengrund (DE)

( * ) Notice: Subject to any disclaimer, the term of this patent is extended or adjusted under 35 U.S.C. 154(b) by 201 days.

(21) Appl. No.: 12/745,600

(22) PCT Filed: Nov. 15, 2008

(86) PCT No.: PCT/EP2008/009677
§ 371 (c)(1),
(2), (4) Date: Jul. 29, 2010

(87) PCT Pub. No.: WO2009/068192
PCT Pub. Date: Jun. 4, 2009

(65) Prior Publication Data
US 2010/0309559 A1 Dec. 9, 2010

(30) Foreign Application Priority Data
Nov. 29, 2007 (DE) .......................... 10 2007 057 868

(51) Int. Cl.
*G02B 27/10* (2006.01)

(52) U.S. Cl. ........ 359/618; 359/621; 359/622; 359/626; 359/641

(58) Field of Classification Search .................. 359/618, 359/619, 621–626; 347/134, 241, 244, 256, 347/258; 438/7, 20, 30, 48, 166, 308, 478, 438/479, 476, 486, 487, 795, 799; 219/121.16, 219/121.65, 121.73, 121.75; 372/9, 25, 101; 356/30, 121, 138; 250/492.1, 492.2, 492.22; 353/31
See application file for complete search history.

(56) References Cited

U.S. PATENT DOCUMENTS

| | | | |
|---|---|---|---|
| 5,721,416 A | 2/1998 | Burghardt et al. | |
| 6,341,042 B1 | 1/2002 | Matsunaka et al. | |
| 6,423,927 B1 | 7/2002 | McCulloch | |
| 6,471,372 B1 | 10/2002 | Lissotschenko et al. | |
| 6,524,977 B1 * | 2/2003 | Yamazaki et al. | 438/799 |
| 6,542,178 B2 * | 4/2003 | Miyagawa et al. | 347/256 |
| 6,596,613 B1 * | 7/2003 | Kusumoto et al. | 438/487 |
| 6,707,614 B2 * | 3/2004 | Tanaka | 359/626 |
| 6,947,452 B2 * | 9/2005 | Kusumoto et al. | 372/9 |
| 7,208,358 B2 * | 4/2007 | Kusumoto et al. | 438/166 |
| 7,303,980 B2 * | 12/2007 | Yamazaki et al. | 438/478 |
| 7,452,788 B2 * | 11/2008 | Yamazaki et al. | 438/476 |
| 7,486,444 B2 | 2/2009 | Moriwaka | |

(Continued)

FOREIGN PATENT DOCUMENTS

| | | |
|---|---|---|
| DE | 195 20 187 C1 | 9/1996 |
| DE | 600 17 076 T2 | 12/2005 |
| DE | 10 2006 018 504 A1 | 10/2007 |

(Continued)

*Primary Examiner* — Loha Ben
(74) *Attorney, Agent, or Firm* — Laurence A. Greenberg; Werner H. Stemer; Ralph E. Locher

(57) ABSTRACT

A beam forming device produces a linear intensity distribution on a work plane. The device contains a laser light source that can emit laser radiation, an optical device that can transfer the laser radiation in a linear intensity distribution on the work plane, and lens that are used to influence the linear intensity distribution on the work plane and that can be displaced in the direction of diffusion of the laser radiation. The intensity profile can be modified perpendicular to the extension of the linear intensity distribution by modifying the position of the lens in the direction of diffusion of the laser radiation.

30 Claims, 9 Drawing Sheets

U.S. PATENT DOCUMENTS

| | | | |
|---|---|---|---|
| 7,517,774 B2 * | 4/2009 | Kusumoto et al. | 438/487 |
| 7,939,435 B2 * | 5/2011 | Kusumoto et al. | 438/487 |
| 2003/0202251 A1 | 10/2003 | Yamazaki et al. | |
| 2005/0023218 A1 | 2/2005 | Calandra, Jr. | |
| 2005/0097061 A1 | 5/2005 | Shapiro et al. | |
| 2006/0209310 A1 | 9/2006 | Muenz et al. | |
| 2006/0291509 A1 | 12/2006 | Mitra et al. | |

FOREIGN PATENT DOCUMENTS

| | | |
|---|---|---|
| EP | 1 006 382 A1 | 6/2000 |
| EP | 1 528 455 A1 | 5/2005 |
| EP | 1 617 275 A1 | 1/2006 |
| EP | 1 708 008 A1 | 10/2006 |
| WO | 2007/122061 A1 | 11/2007 |

* cited by examiner

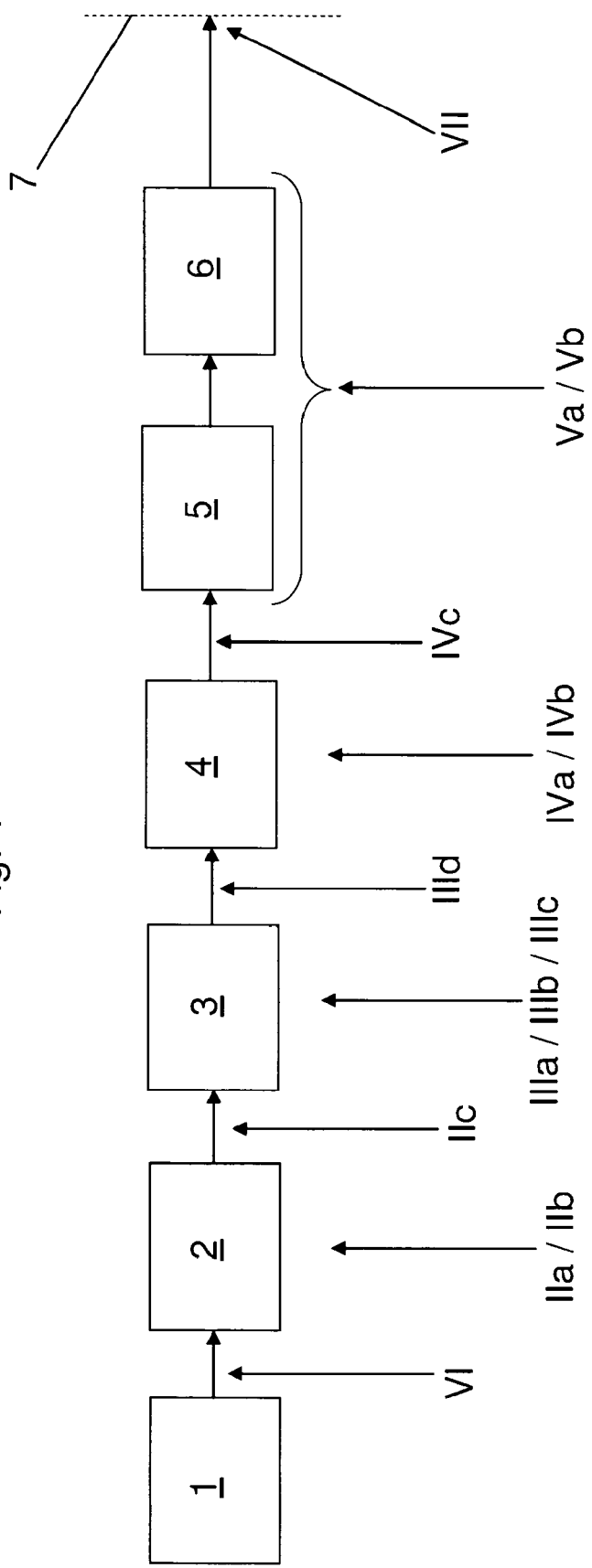

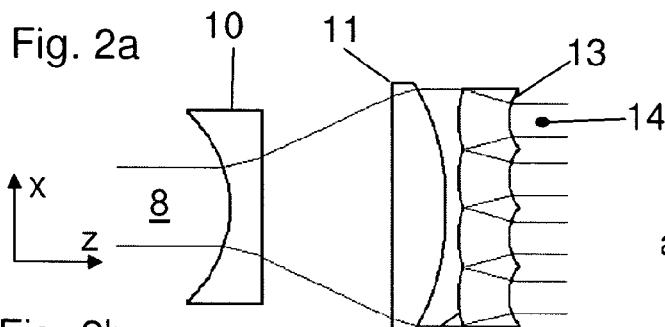
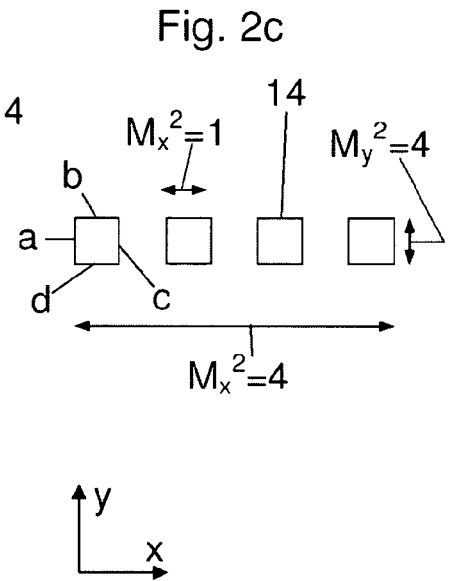
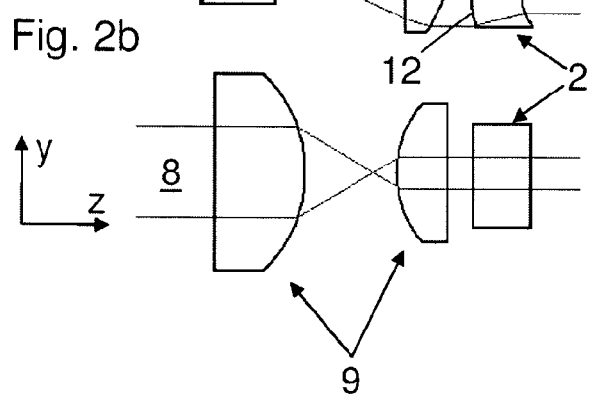
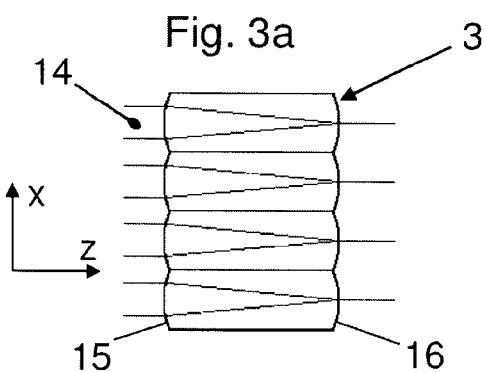
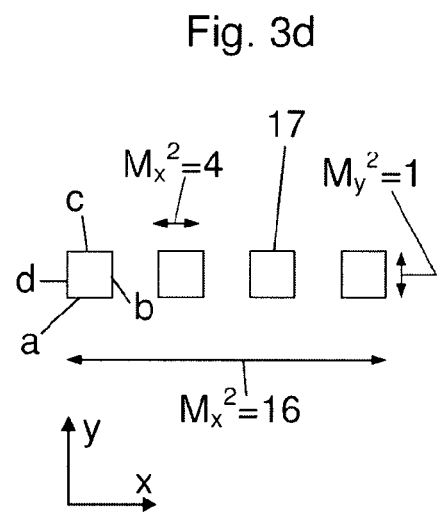
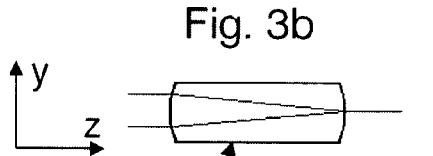
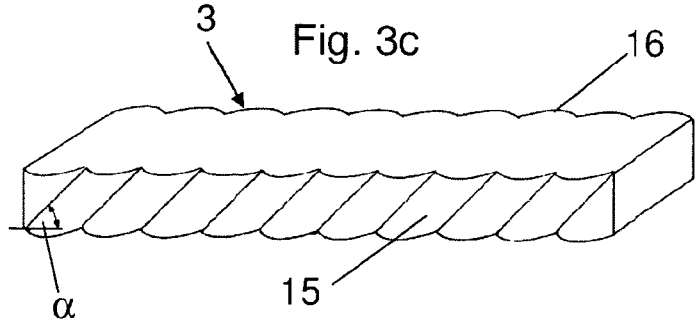
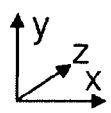

Fig. 4a
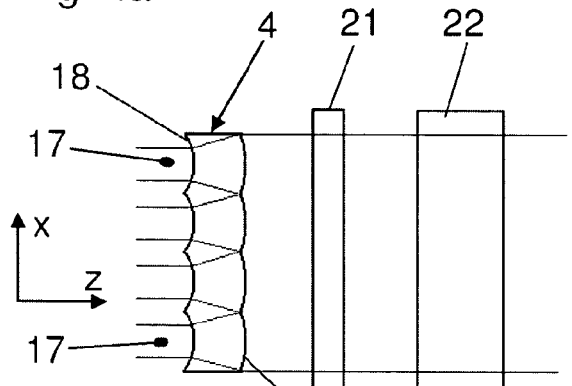
Fig. 4b
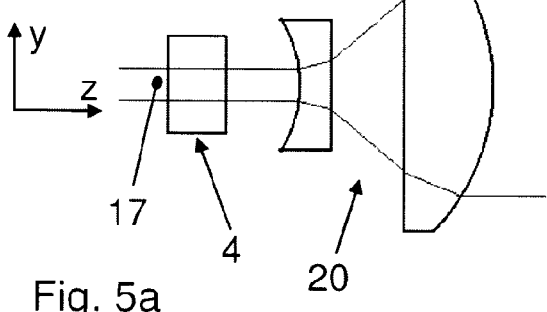
Fig. 4c
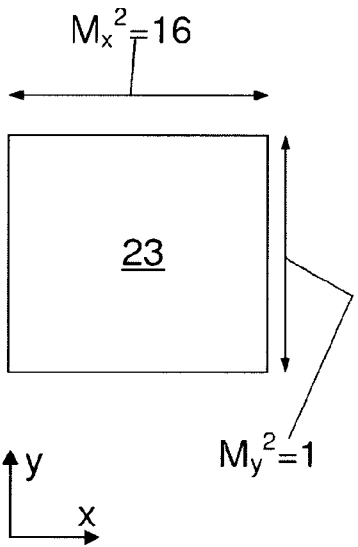
Fig. 5a
Fig. 5b
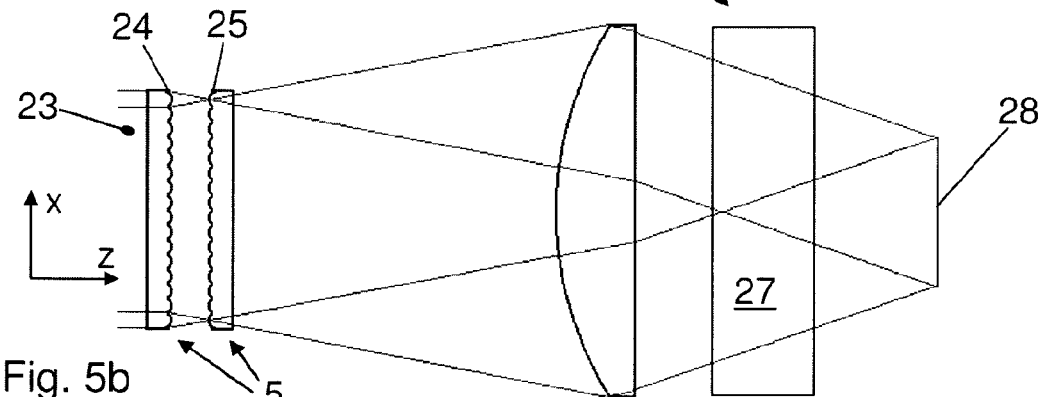
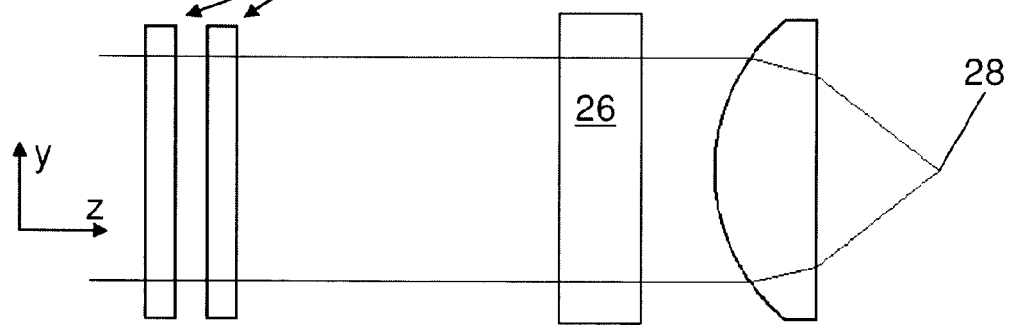

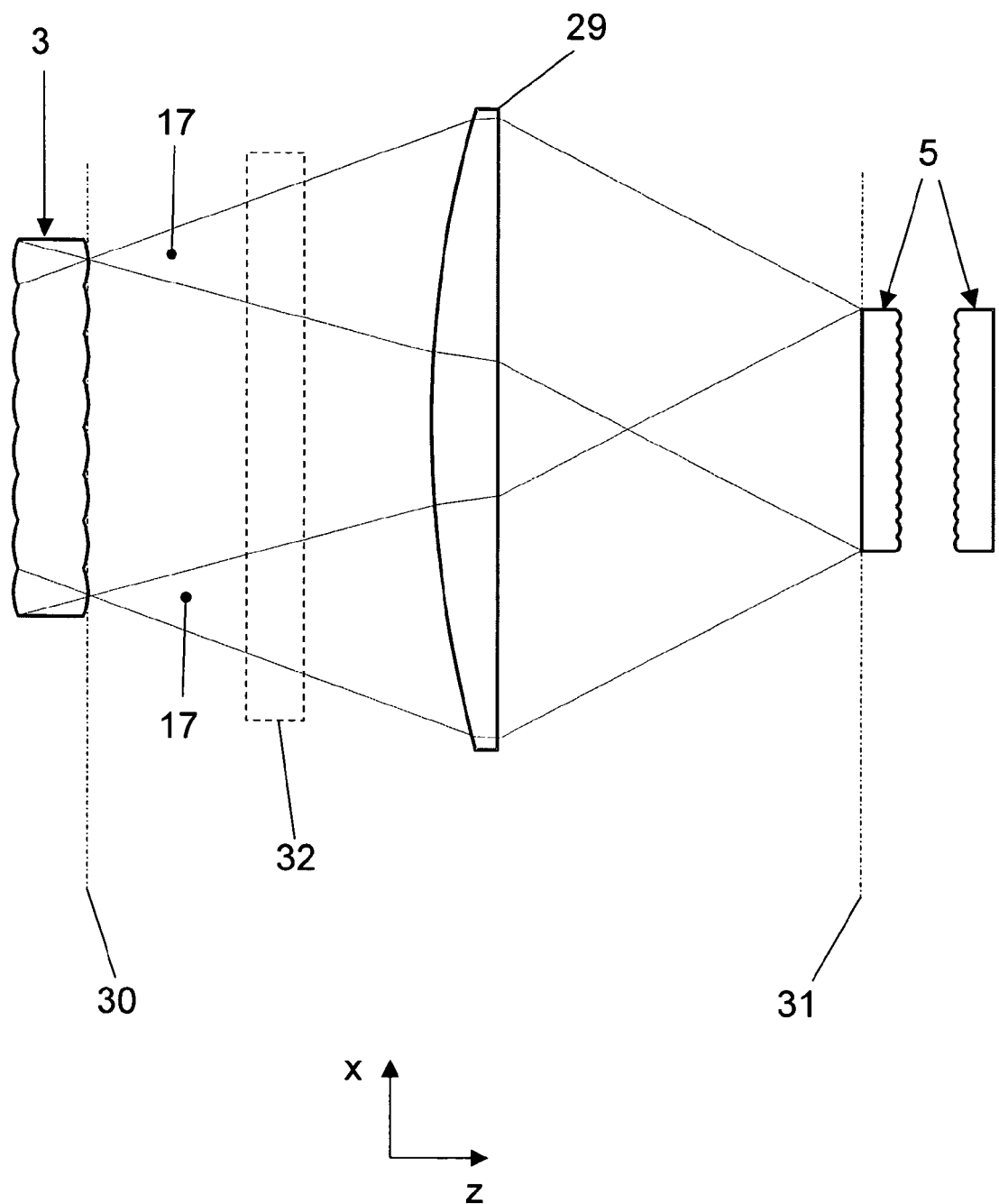

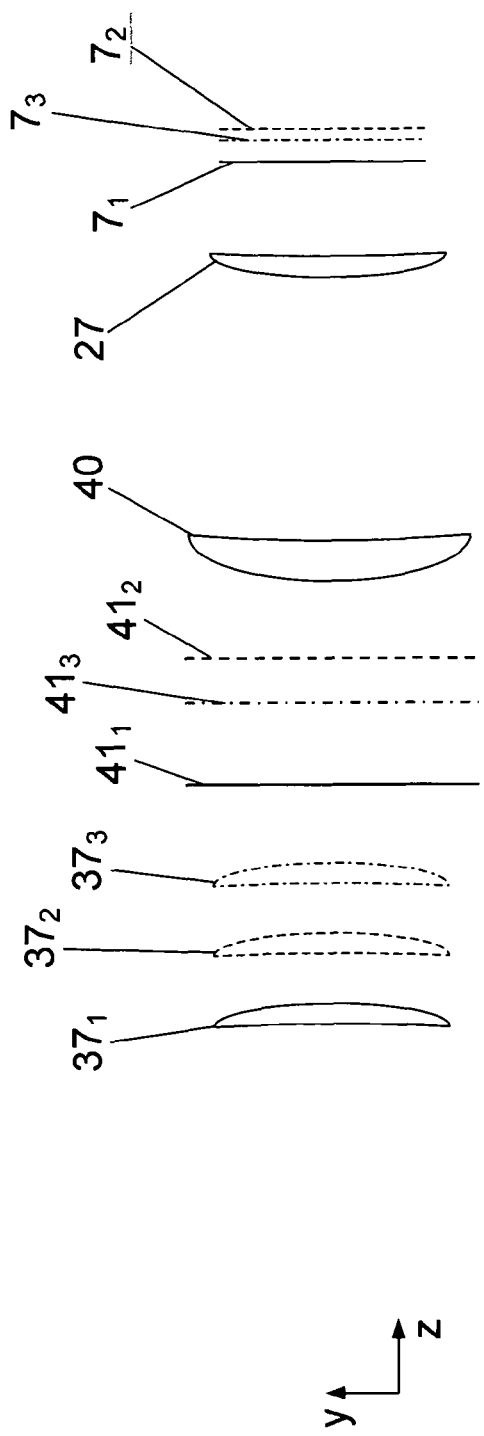
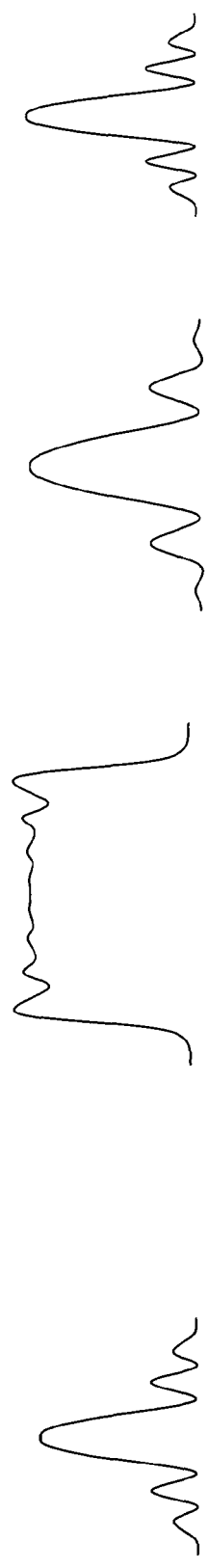

DEVICE FOR BEAM SHAPING

The present invention relates to a device for beam shaping, including producing a linear intensity distribution in a working plane.

BACKGROUND OF THE INVENTION

Field of the Invention

Definitions: In the propagation direction of the laser radiation means average propagation direction of the laser radiation, particularly if the latter is not a plane wave or is at least partly divergent. Light beam, partial beam or beam, unless expressly indicated otherwise, does not mean an idealized beam of geometrical optics, but rather a real light beam, such as a laser beam having a Gaussian profile or a modified Gaussian profile, for example, which does not have an infinitesimally small but rather an extended beam cross section.

Devices of the type mentioned in the introduction are sufficiently known. Typical laser light sources of such devices are Nd-YAG lasers or excimer lasers, for example. By way of example, Nd-YAG lasers not operated as single-mode lasers have a beam quality factor $M^2$ of approximately 8 to 25. The beam quality factor $M^2$ is a measure of the quality of the laser beam. By way of example, a laser beam having a pure Gaussian profile has a beam quality factor $M^2$ of 1. The beam quality factor $M^2$ corresponds approximately to the number of modes of the laser radiation.

The beam quality factor $M^2$ influences the focusability of the laser radiation. For a laser beam having a Gaussian profile, the thickness d or the beam waist in the focal region is proportional to the wavelength $\lambda$, of the laser beam to be focused and inversely proportional to the numerical aperture NA of the focusing lens. The following formula therefore holds true for the thickness of the laser beam in the focal region:

$$d \propto \frac{\lambda}{NA}.$$

In the case of a laser beam which does not have a Gaussian profile or which has a beam quality factor $M^2$ greater than 1, the minimum thickness in the focal region or the beam waist in the focal region is additionally proportional to the beam quality factor in accordance with the following formula:

$$d \propto \frac{\lambda}{NA} \cdot M^2.$$

It is therefore evident that the greater the beam quality factor, the worse laser radiation can be focused. It should be noted at this point that the beam quality factor $M^2$ can have different magnitudes with regard to two directions perpendicular to the propagation direction of the laser radiation. In this case a distinction is made between the beam quality factor $M_x^2$ with regard to a first direction, designated by x, for example, and the beam quality factor $M_y^2$ with regard to a second direction, which is designated by y, for example, and which is perpendicular to the first direction x. It is therefore entirely possible for the beam quality factor $M_x^2$ to be greater or less than the beam quality factor $M_y^2$.

Furthermore, in the prior art laser radiation is homogenized regularly prior to focusing into a working plane. This is done for example by means of lens arrays having a multiplicity of lenses, such that the laser radiation is split by said lenses into a multiplicity of partial beams that are superimposed in the working plane. It is evident, however, that the number of partial beams cannot be increased arbitrarily because in the case of an excessively large number of partial beams, upon corresponding superimposition of the partial beams in the working plane, high-frequency oscillations are caused by the interference between the beams. This would lead to an impairment of the beam quality in the working plane. The criterion for the occurrence of said high-frequency oscillations is the spatial coherence of the laser radiation in a direction perpendicular to the propagation direction. The worse said spatial coherence, the greater the number of partial beams into which the light can be split without high-frequency oscillations occurring upon superimposition. Under certain circumstances, the abovementioned beam quality factor $M^2$, or $M_x^2$ or $M_y^2$, can also be an indication of the spatial coherence, such that in the case of a large beam quality factor, splitting into a large number of partial beams is possible under certain circumstances.

Intensity distributions in the direction perpendicular to the longitudinal extent of the linear focal region which correspond to a so-called top hat profile are desired in various applications. An intensity distribution having a sharp intensity maximum can be more advantageous in other applications.

BRIEF SUMMARY OF THE INVENTION

Proceeding from these considerations, the present invention is based on the object of further developing a device of the type mentioned in the introduction in such a way that it is possible to influence the intensity distribution in the direction perpendicular to the longitudinal extent of the linear focal region.

This is achieved according to the invention by means of a device of the type as now presented in the appended claims.

In accordance with the present invention, it is provided that the device comprises lens means, preferably lens means which can be moved in the propagation direction of the laser radiation, for influencing the linear intensity distribution in the working plane, wherein, by altering the position of the lens means in the propagation direction of the laser radiation, it is possible to alter the intensity profile perpendicularly to the extent of the linear intensity distribution.

In particular, by altering the position of the lens means in the propagation direction of the laser radiation, the intensity profile can undergo transition from a top hat form to a form having a comparatively sharp maximum. As a result, a suitable intensity profile can be selected depending on the application.

It may be provided that the device furthermore comprises a telescope, which is arranged downstream of the movable lens means in the propagation direction of the laser radiation, wherein the telescope is formed from at least two further lens means which have a refractive power at least in a direction perpendicularly to the direction of the longitudinal extent of the linear intensity distribution. By means of said telescope, the intensity profile of the laser radiation in the output-side focal plane of the movable lens means can be transferred into the working plane. In this case, the telescope can, in particular, reduce the beam waist in the direction perpendicular to the longitudinal extent of the linear intensity distribution.

It may be provided that the laser light source can emit a multi-mode laser radiation, in the case of which the beam quality factor $M_x^2$ with regard to a first direction perpendicular to the propagation direction of the laser radiation is greater than 1 and also the beam quality factor $M_y^2$ with regard to a second direction perpendicular to the propagation direction is greater than 1.

There is the possibility that the device furthermore comprises beam transformation means, which are arranged in the device in such a way that they can transform the laser radiation or partial beams of the laser radiation in such a way that the beam quality factor with regard to the first direction is increased and that the beam quality factor with regard to the second direction is reduced.

The beam transformation means can transform the laser radiation or partial beams of the laser radiation in such a way that the beam quality factor and/or the spatial coherence properties with regard to the first direction of the laser radiation or of each of the partial beams is or are interchanged with the beam quality factor and/or the spatial coherence properties with regard to the second direction.

It is evident that in this way the beam quality factor for one of the two directions can be significantly smaller than before the beam transformation, whereas the beam quality factor for the other of the two directions can be significantly larger after the beam transformation than before the beam transformation. The reason for this is also due to the splitting of the laser radiation into a plurality of partial beams. This splitting can be effected either in the beam transformation means or in separate beam splitting means arranged upstream of the beam transformation means. It is evident that in this case the beam quality factor can be reduced, in particular can be divided by the number of partial beams, with regard to one of the two directions perpendicular to the propagation direction.

What can be achieved is that the beam quality factor with regard to one direction is significantly reduced and does not become much greater than 1, wherein the beam quality factor with regard to the other direction is increased relative to the state before the beam transformation. If, however, a very thin line is to be produced by the device according to the invention in a working plane, it is important that a very good focusing onto a very small beam waist can be effected in the direction perpendicular to the longitudinal extent of the line. In the case of a very small beam quality factor with regard to this direction, a very thin linear profile can thus be obtained. In particular, a highly defined intensity distribution with a top hat profile can be produced in this case. The fact that in this case the beam quality factor with regard to the longitudinal extent of the line is significantly increased at the same time does not prove to be disadvantageous since no or no high degree of focusing is desired in the longitudinal direction of the line. On the contrary, as a result of the increase in the beam quality factor in the longitudinal direction of the line, in general the spatial coherence in this direction is also significantly reduced. This means, however, that lens arrays having very many lenses arranged alongside one another in this longitudinal direction can be used for homogenization without undesirable interference effects such as high-frequency oscillations occurring in the working plane. Consequently, a better homogeneity in the longitudinal direction of the line can additionally be obtained by means of the device according to the invention.

It may be provided that the device furthermore comprises beam splitting means for splitting the laser radiation into a plurality of partial beams, which are preferably arranged upstream of the beam transformation means in the propagation direction of the laser radiation in such a way that they can Fourier-transform the laser radiation.

In this case, there is the possibility that the beam transformation means are arranged downstream of the beam splitting means, in particular in the output-side Fourier plane of the beam splitting means. What can be achieved by means of the Fourier transformation is that an intensity profile that deviates from a Gaussian form is realized with regard to the direction perpendicular to the longitudinal extent of the linear intensity distribution. By way of example, a top hat profile or a profile having a comparatively sharp maximum can be achieved. What can be achieved by means of the Fourier transformation, in particular, is that a near field imaging of the partial beams emerging from the beam transformation means arises in the working plane.

Beam transformation means are known as such from the prior art, for example from EP 1 006 382 A1, EP 1 617 275 A1 and from EP 1 528 425 A1. However, they involve the transformation of the highly inhomogeneous laser radiation of a semiconductor laser with very small beam quality factor $M_y^2$ of the fast axis direction and very large beam quality factor $M_x^2$ of the slow axis direction in such a way that the laser radiation has a comparable beam quality in both directions after the beam transformation and corresponding collimation. In the case of the present invention, the beam transformation means known per se are utilized for the opposite effect. Laser radiation which, before the transformation, has beam quality factors $M_y^2$ and $M_x^2$, respectively, with regard to both directions which are not very different or are at least approximately equal in magnitude is transformed in such a way that after the beam transformation, the beam quality factor with regard to one of the two directions differs significantly from the beam quality factor with regard to the other of the two directions.

BRIEF DESCRIPTION OF THE DRAWINGS

Further features and advantages of the present invention will become clear on the basis of the following description of preferred exemplary embodiments with reference to the accompanying illustrations, in which

Figure 9A:
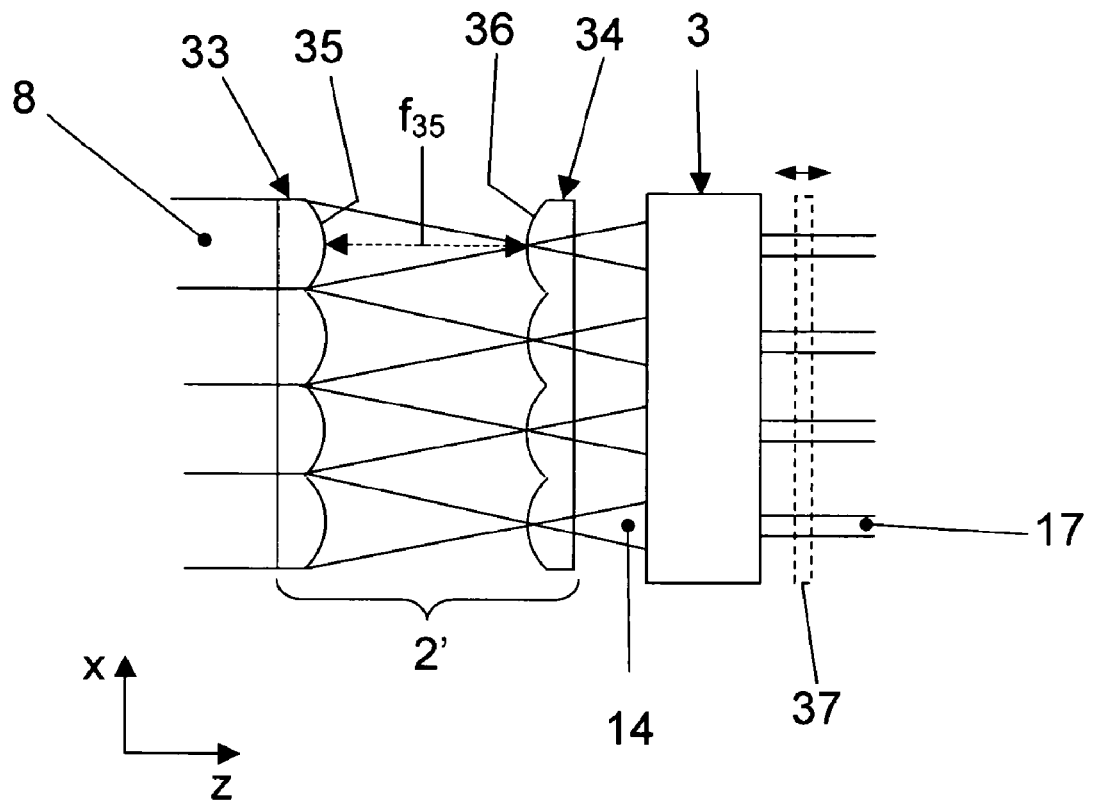

BRIEF DESCRIPTION OF THE SEVERAL
VIEWS OF THE DRAWING

Figure 9B:
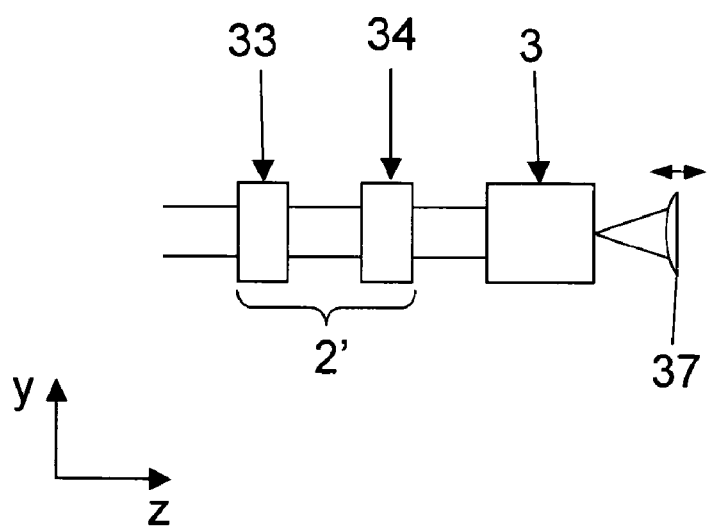
Figure 10:
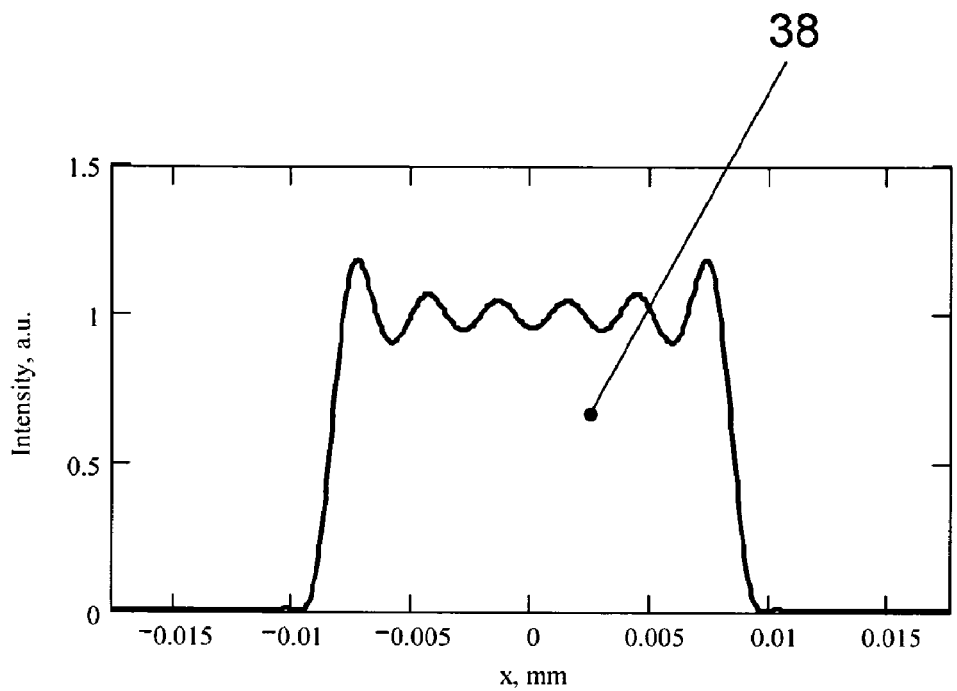
Figure 11:
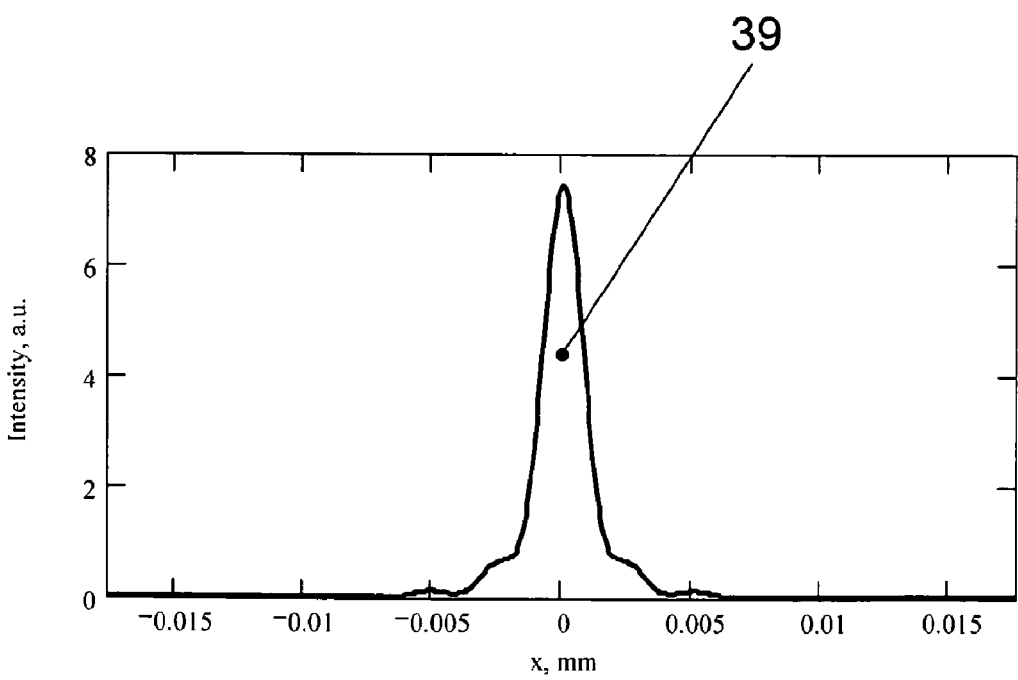
Figure 12:
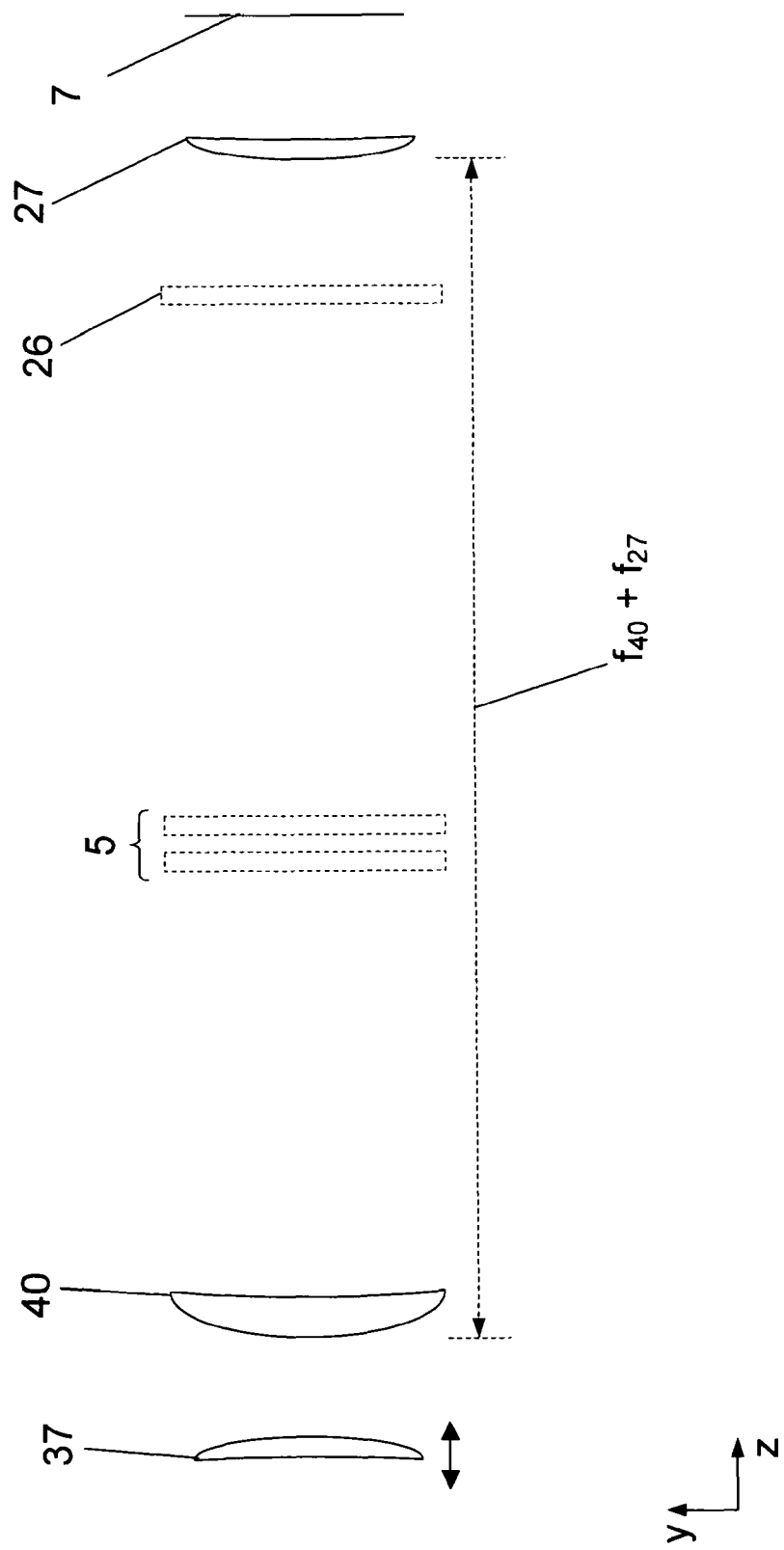
Figure 14A:
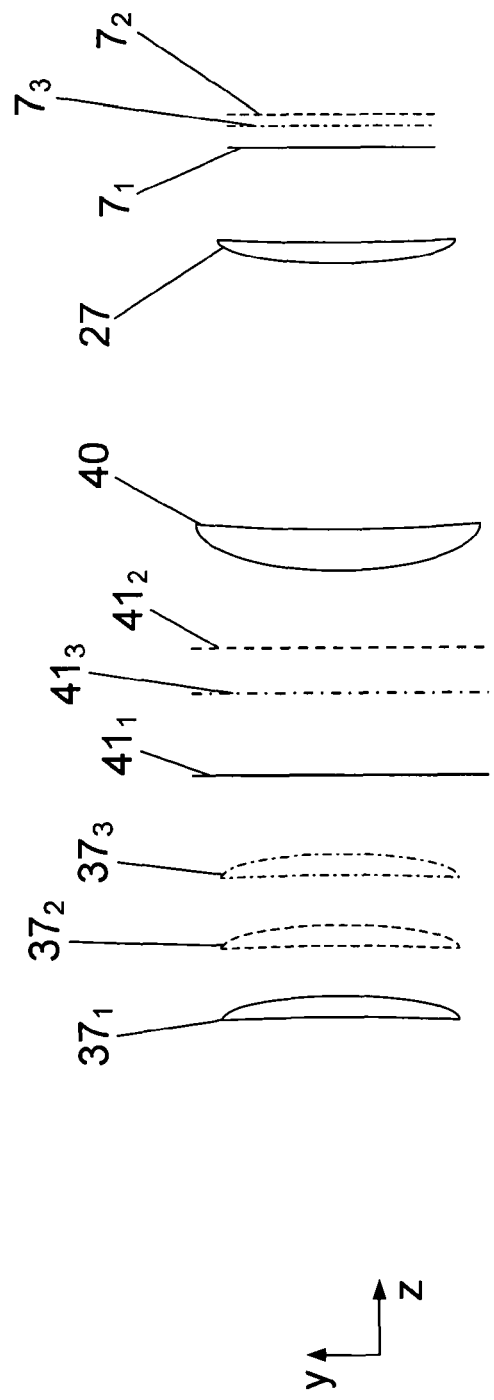
Figure 14E:
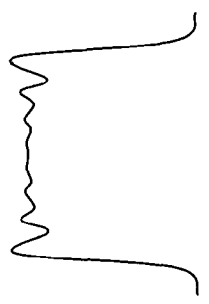
Figure 14D:
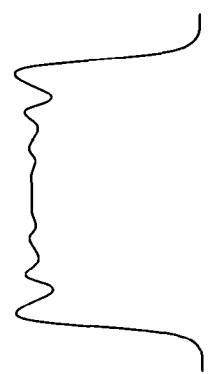
Figure 14C:
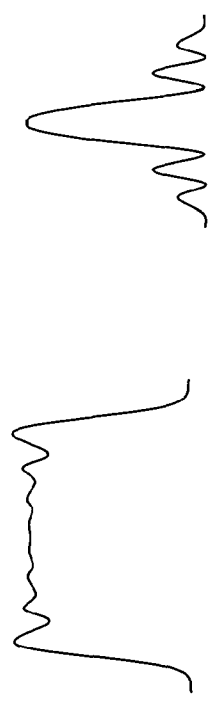
Figure 14B:
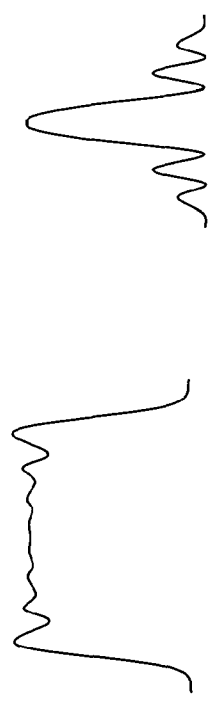

FIG. 1 shows a schematic construction of a device according to the invention;

FIG. 2a shows a plan view of a first embodiment of the beam splitting means of a device according to the invention;

FIG. 2b shows a side view of the beam splitting means in accordance with FIG. 2a;

FIG. 2c shows a cross section through the laser radiation after passing through the beam splitting means in accordance with FIG. 2a and FIG. 2b;

FIG. 3a shows a plan view of the beam transformation means of the device according to the invention;

FIG. 3b shows a side view of the beam transformation means in accordance with FIG. 3a;

FIG. 3c shows a perspective view of the beam transformation means in accordance with FIG. 3a;

FIG. 3d shows a cross section through the laser radiation after passing through the beam transformation means in accordance with FIG. 3a to FIG. 3c;

FIG. 4a shows a plan view of a first embodiment of the beam combining means of the device according to the invention;

FIG. 4b shows a side view of the beam combining means in accordance with FIG. 4a;

FIG. 4c shows a cross section through the laser radiation after passing through the beam combining means in accordance with FIG. 4a and FIG. 4b;

FIG. 5a shows a plan view of homogenizing and focusing means of the device according to the invention;

FIG. 5b shows a side view of the homogenizing and focusing means in accordance with FIG. 5a;

FIG. 6 shows a cross section through the laser radiation before passing through the device according to the invention;

FIG. 7 shows a cross section through the laser radiation in the working plane or after passing through the device according to the invention;

FIG. 8 shows a plan view of beam transformation means, homogenizing means and a second embodiment of beam combining means of the device according to the invention;

FIG. 9a shows a plan view of a second embodiment of the beam splitting means of a device according to the invention with beam transformation means arranged downstream thereof;

FIG. 9b shows a side view of the beam splitting means and the beam transformation means in accordance with FIG. 9a;

FIG. 10 schematically shows a first intensity profile;

FIG. 11 schematically shows a second intensity profile;

FIG. 12 shows a schematic side view of a region between the beam transformation means and the working plane of a further embodiment of a device according to the invention;

FIG. 13a shows a view which corresponds to FIG. 12 and in which three different positions of the lens means for influencing the intensity distribution are depicted;

FIG. 13b schematically shows an intensity profile upstream of the lens means;

FIG. 13c schematically shows an intensity profile in the working plane which corresponds to the first position of the lens means;

FIG. 13d schematically shows an intensity profile in the working plane which corresponds to the second position of the lens means;

FIG. 13e schematically shows an intensity profile in the working plane which corresponds to the third position of the lens means;

FIG. 14a shows a view which corresponds to FIG. 12 and in which three different positions of the lens means for influencing the intensity distribution are depicted;

FIG. 14b schematically shows an intensity profile upstream of the lens means;

FIG. 14c schematically shows an intensity profile in the working plane which corresponds to the first position of the lens means;

FIG. 14d schematically shows an intensity profile in the working plane which corresponds to the second position of the lens means; and FIG. 14e schematically shows an intensity profile in the working plane which corresponds to the third position of the lens means.

DETAILED DESCRIPTION OF THE PREFERRED EMBODIMENTS

A system of Cartesian coordinates is depicted in some of the illustrations for the sake of better orientation.

It can be seen schematically from FIG. 1 that the device according to the invention comprises a laser light source 1, beam splitting means 2, beam transformation means 3, beam combining means 4, homogenizing means 5 and a lens arrangement 6, which can produce a linear intensity distribution of the laser radiation in the working plane 7.

There is the possibility that the laser light source 1 is embodied as an Nd-YAG laser or as an excimer laser. In this case, the Nd-YAG laser can be operated for example at the fundamental frequency or with doubled frequency, or tripled, and so on. It is indicated in FIG. 6 that the laser radiation 8 emerging from the laser light source 1 has a circular cross section, for example. It is furthermore indicated in FIG. 6 that the laser radiation 8 has a beam quality factor $M_x^2 = M_y^2 = 4$ both in the x direction and in the y direction.

The beam splitting means 2 can be seen in detail from FIG. 2a and FIG. 2b. A telescope 9 comprising crossed two-sided cylindrical lenses 10 and 11 is disposed upstream of the beam splitting means 2. The telescope 9 expands the laser radiation 8 with regard to the x direction and constricts the laser radiation 8 with regard to the y direction (in this respect, see FIG. 2a and FIG. 2b).

The beam splitting means 2 are formed as a cylindrical lens array, wherein the cylinder axes of the cylindrical lens array extend in the y direction. In particular, an array of convex cylindrical surfaces 12 is provided on the entrance surface and an array of concave cylindrical surfaces 13 is provided on the exit surface of the beam splitting means. What can be achieved through a corresponding choice of the focal lengths of said cylindrical surfaces and through a corresponding choice of their spacing is that four partial beams 14 spaced apart from one another in the x direction emerge from the beam splitting means 2. FIG. 2c shows that said partial beams 14 have a square cross section.

It is entirely possible to provide more or fewer than four cylindrical surfaces 12, 13, such that more or fewer than four partial beams 14 arise. By way of example, eight or thirteen cylindrical surfaces 12, 13 can be provided.

FIG. 2c furthermore reveals that each individual one of the partial beams 14 has a beam quality factor $M_x^2 = 1$ in the x direction and a beam quality factor $M_y^2 = 4$ in the y direction. Overall, therefore, a beam quality factor $M_x^2 = 4$ results for the x direction for all four partial beams 14 together.

The laser radiation split into individual partial beams 14 in this way enters into the beam transformation means 3, which can be seen from FIG. 3a to FIG. 3c. The beam transformation means 3 likewise comprise a cylindrical lens array with an array of convex cylindrical surfaces 15 on the entrance surface and an array of convex cylindrical surfaces 16 on the exit surface of the beam transformation means 3. In this case, the cylinder axes of the cylindrical surfaces 15, 16 are inclined at an angle $\alpha = 45°$ with respect to the y direction and with respect to the x direction, respectively. When passing through the beam transformation means 3, the individual partial beams 14 are transformed in such a way that they appear to be mirrored at a plane parallel to the propagation direction z. FIG. 2c and FIG. 3d indicate how the partial beams 14 are converted into transformed partial beams 17. In this case, the left-hand partial beam 14 in FIG. 2c and the left-hand partial beam 17 in FIG. 3d are each provided with a letter a, b, c, d on each of their sides. It is evident that an interchange of said letters a, b, c, d takes place according to a pattern corresponding to a mirroring at a diagonal area of these partial beams 14, 17. This transformation could also be designated as a rotation about the z direction by 90° with subsequent interchange of the sides a, c.

It can be seen from FIG. 3d that the beam quality factor of the partial beams 17 is different from that of the partial beams 14. In particular, in the case of each of the partial beams 17, the beam quality factor $M_x^2$ is equal to 4 for the x direction and the beam quality factor $M_y^2$ is equal to 1 for the y direction. Overall, therefore, a beam quality factor $M_x^2$ equal to 16 results for the x direction for all four partial beams 17 together.

After passing through the beam transformation means 3, the individual partial beams 17 impinge on the beam combining means 4. The beam combining means 4 are formed in a manner corresponding to the beam splitting means 2 by an array of concave cylindrical surfaces 18 on the entrance surface and an array of convex cylindrical surfaces 19 on the exit surface of the beam combining means 4. A further telescope 20 is introduced into the beam path downstream of the beam combining means 4, which telescope expands the beam in the y direction by means of correspondingly arranged cylindrical lenses 21, 22.

FIG. 4c shows the cross section of the laser radiation 23 after passing through the beam combining means 4 and the telescope 20. It is evident that the laser radiation 23 is an individual laser beam having a square cross section. In particular, in this case the beam quality factor $M_x^2$ is equal to 16 for the x direction and the beam quality factor $M_y^2$ is equal to 1 for the y direction.

There is the possibility of not providing any beam combining means. Furthermore, the telescope 20 can also be dispensed with or the telescope 20 can be replaced by differently configured lenses which likewise comprise cylindrical lenses having cylinder axes that extend in the X direction. One example of such a configuration is illustrated in FIG. 12 to FIG. 14e.

This laser radiation 23 passes through the homogenizing means 5 (see FIG. 5a and FIG. 5b) formed as two arrays of cylindrical lenses 24, 25 arranged one behind the other. In this case, the arrays of cylindrical lenses 24, 25 are arranged approximately at the spacing of the focal length of the cylindrical lenses in the z direction with respect to one another. On account of the beam transformation and the associated increase in the beam quality factor $M_x^2$ from 4 to 16, up to 16 cylindrical lenses 24, 25 can be arranged alongside one another in the x direction without undesirable interference effects occurring in the working plane 7.

After passing through the homogenizing means 5, the laser radiation passes through the lens arrangement 6 comprising two lens means 26, 27, which are formed as two cylindrical lenses spaced apart from one another, wherein the cylinder axis of the first lens means 26 formed as a cylindrical lens extends in the y direction and the cylinder axis of the second lens means 27 formed as a cylindrical lens extends in the x direction. The lens arrangement 6 not only focuses the laser radiation in such a way that a linear intensity distribution 28 arises in the working plane 7 (see FIG. 7), but also superimposes in the working plane 7 individual parts of the laser radiation which propagate in different and/or identical directions on account of the cylindrical lenses 24, 25. This is the principle known per se for homogenization with cylindrical lens arrays and downstream lenses which serve as field lenses and superimpose the laser radiation in a working plane. The lens arrangement 6 therefore serves as focusing means and contributes to the homogenization.

The linear intensity distribution 28 in the working plane 7 can be seen by way of example from FIG. 7. In this case, said linear intensity distribution 28 is illustrated schematically and can have a length 1 of between 10 mm and 1000 mm, for example of approximately 100 mm, and a thickness d of between 1 μm and 100 μm, for example of approximately 10 μm. It is evident, therefore, that a focal region with a very small thickness and, if appropriate, also a relatively large depth of focus can be produced with the device according to the invention even when a multi-mode laser light source is used. It is entirely possible for the thickness of the intensity distribution 28 to be made less than 10 μm. This is dependent, for example, on the numerical aperture of the lens used.

In the Y direction, that is to say perpendicular to the longitudinal extent of the linear intensity distribution 28, the laser radiation can have a Gaussian distribution or a top hat distribution or any other distribution.

FIG. 8 shows a further embodiment of the beam combining means. These beam combining means comprise lens means 29 serving as a Fourier lens or Fourier lenses. This means that the output plane 30 of the beam transformation means 3 is arranged in the input-side Fourier plane or focal plane of the lens means 29, and that the input plane 31 of the homogenizing means 5 is arranged in the output-side Fourier plane or focal plane of the lens means 29. A Fourier transformation of the intensity distribution in the output plane 30 of the beam transformation means 3 into the input plane 31 of the homogenizing means 5 therefore takes place.

The individual partial beams 17, two of which are depicted in FIG. 8, are simultaneously superimposed with one another in the input plane 31 of the homogenizing means 5. Owing to the fact that in this case each of the individual partial beams 17 is incident in the input plane 31 from a different direction, the number of cylindrical lenses 24, 25 of the homogenizing means 5 can be reduced, in particular by a factor corresponding to the number of partial beams 17 and thus to the number of cylindrical surfaces 16 of the beam transformation means 3.

The lens means 29 can be formed as an individual lens or as a plurality of lenses. If the lens means 29 are formed by a plurality of lenses, the latter are arranged in the device in such a way that the output plane 30 of the beam transformation means 3 is arranged in the input-side system focal plane of the lens means 29, and that the input plane 31 of the homogenizing means 5 is arranged in the output-side system focal plane of the lens means 29.

Furthermore, the lens or lenses of the lens means 29 can be formed as cylindrical lens whose cylinder axis extends in the Y direction.

Lens means 32 for collimating the laser radiation with regard to the Y direction are depicted by dashed lines in FIG. 8. Said lens means 32 are optional and can be arranged between the beam transformation means 3 and the lens means 29. The lens means 32 can be formed as an individual lens or as a plurality of lenses. Furthermore, the lens or lenses of the lens means 32 can be formed as cylindrical lens whose cylinder axis extends in the X direction.

A second embodiment of beam splitting means 2' can be seen from FIG. 9a and FIG. 9b. These beam splitting means 2' comprise two cylindrical lens arrays 33, 34. The first cylindrical lens array 33 has on its exit side a plurality of convex cylindrical lenses 35 which are arranged alongside one another in the X direction and the cylinder axes of which extend in the Y direction. The second cylindrical lens array 34 has on its entrance side a plurality of convex cylindrical lenses 36 which are arranged alongside one another in the X direction and the cylinder axes of which likewise extend in the Y direction. The distance between the cylindrical lens arrays 33, 34 corresponds to the focal length $f_{35}$ of the cylindrical lenses 35 of the first cylindrical lens array 33.

In this way, it is possible to achieve a Fourier transformation of the laser radiation 8, wherein, in particular, the beam transformation means 3 are arranged in the output-side Fourier plane of the beam splitting means 2'. This Fourier transformation makes it possible to obtain, in the working plane 7 in the Y direction or in the direction perpendicular to the longitudinal extent of the linear intensity distribution 28, an intensity profile having a top hat form 38, as is illustrated by way of example in FIG. 10.

A comparable intensity profile can be obtained independently of the configuration of the beam splitting means 2, 2' by means of lens means 37 which are formed as a cylindrical lens and which are arranged downstream of the beam transformation means 3 or alternatively downstream of the homogenizing means 5. The cylinder axis of the lens means 37 extends in the X direction (see FIG. 9a and FIG. 9b).

A variant in which the lens means 37 can be moved in the propagation direction Z of the laser radiation is particularly advantageous. By altering the Z position of the lens means 37, it is possible to influence the intensity profile obtained in the working plane 7 in the Y direction or in the direction perpendicular to the longitudinal extent of the linear intensity distribution 28. By way of example, by altering the Z position of the lens means 37, it is possible to change from an intensity profile having a top hat form 38 to an intensity profile having a form 39 (see FIG. 11), which has a comparatively sharp maximum. An intensity profile of this type has proved to be particularly advantageous in some applications.

In FIG. 12 to FIG. 14e, identical parts are provided with the same reference signs as in FIG. 1 to FIG. 11. In FIG. 12, FIG. 13a and FIG. 14a, the distances between the illustrated optical elements in the propagation direction z of the light are not represented as true to scale.

FIG. 12 shows the region downstream of the beam transformation means 3. In the case of the embodiment illustrated, instead of the cylindrical lenses 21, 22, two convex lens means 37, 40 formed as cylindrical lenses are provided, the cylinder axes of which likewise extend in the X direction. The lens means 37, 40 can therefore influence the intensity profile obtained in the working plane 7 in the Y direction or in the direction perpendicular to the longitudinal extent of the linear intensity distribution 28. The lens means 37 can be the movable lens means 37 illustrated by way of example in FIG. 9a and FIG. 9b.

The homogenizing means 5 and the lens means 26 formed as a cylindrical lens are merely depicted by dashed lines in FIG. 12 because their cylinder axes extend in the y direction, such that these lenses have no influence on the intensity profile obtained in the working plane 7 in the Y direction or in the direction perpendicular to the longitudinal extent of the linear intensity distribution 28. Furthermore, the lens means 27 formed as a cylindrical lens and the working plane 7 are depicted.

By way of example, the lens means 37 have a focal length $f_{37}$ of 30 mm, the lens means 40 have a focal length $f_{40}$ of 1000 mm and the lens means 27 have a focal length $f_{27}$ of 30 mm. As is indicated schematically in FIG. 12, the distance between the lens means 40 and the lens means 27 corresponds to the sum $f_{40}+f_{27}$ of the focal lengths $f_{40}$, $f_{27}$ of the lens means 40 and of the lens means 27, that is to say 1030 mm, for example. The lens means 40 and the lens means 27 thus form a telescope which can transfer an intensity distribution present upstream of the lens means 40 into the working plane 7. In this case, a demagnifying transfer of the extent of the radiation field or of the beam waist of the laser radiation from the region upstream of the telescope into the working plane 7 will be effected on account of the ratio of the focal lengths $f_{40}/f_{27}=33$. By way of example, this results in an extent of the beam waist in the Y direction or in the direction perpendicular to the longitudinal extent of the linear intensity distribution 28 of approximately 20 μm.

FIG. 13a illustrates the effect of the displacement of the lens means 37. In this case, $37_1$, $37_2$ and $37_3$ designate the lens means at different positions. Furthermore, $41_1$, $41_2$ and $41_3$ designate the output-side focal planes of the lens means 37 which result from the different positions of the lens means 37. Furthermore, $7_1$, $7_2$ and $7_3$ designate the resultant displacements of the working plane 7.

In the case of a construction of the beam splitting means 2' as illustrated in FIG. 9a and FIG. 9b, an intensity distribution in the Y direction as illustrated in FIG. 13b arises in the input-side focal plane of the lens means 37. This intensity distribution corresponds to a function F(x)=(sin(x))/x. Such a function F(x) is the Fourier transform of a top hat intensity distribution. This means that an intensity distribution in the Y direction which corresponds to a top hat distribution is present in the output-side focal plane $41_1$ of the lens means $37_1$ (see FIG. 13a) situated in the first position, that is to say after Fourier transformation by the lens means $37_1$. Said top hat distribution is transferred into the working plane $7_1$ by the telescope formed by the lens means 40 and the lens means 27. In the working plane $7_1$, the laser radiation therefore has a top hat distribution as illustrated in FIG. 13c in the Y direction or in the direction perpendicular to the longitudinal extent of the linear intensity distribution 28.

A displacement of the lens means $37_1$ into the second position, in which the lens means are provided with the reference sign $37_2$, brings about a displacement of the output-side focal plane into the position provided with the reference sign $41_2$. Accordingly, the working plane is also slightly displaced to a position provided with the reference sign $7_2$. It is evident that an alteration of the intensity profile in the working plane $7_2$ to give a distribution in accordance with FIG. 13d is achieved as a result of the displacement of the lens means 37 into the second position. Said distribution substantially corresponds to a distribution in accordance with (sin (x))/x.

A further displacement of the lens means $37_2$ into the third position, in which the lens means are provided with the reference sign $37_3$, brings about a displacement of the output-side focal plane into the position provided with the reference sign $41_3$. Accordingly, the working plane is also slightly displaced to a position provided with the reference sign $7_3$. It is evident that an alteration of the intensity profile in the working plane $7_3$ to give a distribution in accordance with FIG. 13e is achieved as a result of the displacement of the lens means 37 into the third position. Said distribution likewise substantially corresponds to a distribution in accordance with (sin(x))/x, although the extent of the beam waist in the Y direction is slightly reduced by comparison with the distribution in accordance with FIG. 13d.

On account of the magnifying or demagnifying properties of the telescope formed by the lens means 40 and the lens means 27, a displacement of the lens means 37 from the first to the second or third position results in only a scarcely noticeable displacement of the working plane from $7_1$ to $7_2$ or $7_3$. For example, in the case of the focal lengths mentioned by way of example, a displacement of the lens means 37 by 200 mm into the positions designated by $37_2$ or $37_3$ brings about a displacement in the working plane which is smaller by a factor of $33^2$. Consequently, the displacement from $7_1$ to $7_2$ or $7_3$ would be merely 0.18 mm. Such a displacement is comparatively insignificant in practice.

FIG. 14a to FIG. 14e show a case which is comparable to FIG. 13a to FIG. 13e and in which only the intensity distribution in the Y direction in the input-side focal plane of the lens means 37 corresponds to the distribution in accordance with FIG. 14b and thus to a top hat distribution. Such a distribution is present in the input-side focal plane of the lens means 37 for example when the beam splitting means 2 are constructed in the manner illustrated in FIG. 2a and FIG. 2b. An intensity distribution in the output-side focal plane $41_1$ which corresponds to a (sin(x))/x distribution then arises in the case of lens means $37_1$ situated in the first position. A corresponding distribution then also arises in the working plane $7_1$ (see FIG. 14c).

Distributions in the working plane $7_2$, $7_3$ in accordance with FIG. 14d and FIG. 14e arise as a result of displacement of the lens means 37 into the second or third positions designated by $37_2$ and $37_3$. It is evident, therefore, that even in the case of a top hat distribution in the input-side focal plane of the lens means 37, intensity distributions (see FIG. 14c to FIG. 14e) comparable to the case in accordance with FIG. 13a to FIG. 13e can be obtained in the working plane $7_1$, $7_2$, $7_3$.

The lens means 37 can consist of an individual cylindrical lens or of a plurality of lenses. Furthermore, the lens means 40 can also consist of an individual cylindrical lens or of a plurality of lenses. Furthermore, the lens means 27 can also consist of an individual cylindrical lens or of a plurality of lenses.

The invention claimed is:

1. A device for beam shaping, including producing a linear intensity distribution in a working plane, the device comprising:
    a laser light source for emitting laser radiation;
    an optical device for converting the laser radiation into the linear intensity distribution in the working plane;
    a lens device for influencing the linear intensity distribution in the working plane, and wherein, by altering a position of said lens device in a propagation direction of the laser radiation, it is possible to alter an intensity profile perpendicularly to an extent of the linear intensity distribution.

2. The device according to claim 1, wherein by altering the position of said lens device in the propagation direction of the laser radiation, the intensity profile undergoes transition from a top hat form to a form having a comparatively sharp maximum.

3. The device according to claim 1, wherein said lens device has cylindrical lens each with a cylinder axis oriented in a direction of a longitudinal extent of the linear intensity distribution.

4. The device according to claim 1, further comprising a telescope disposed downstream of said lens device in the propagation direction of the laser radiation, said telescope being formed from at least two further lens devices which have a refractive power at least in a direction perpendicularly to a direction of a longitudinal extent of the linear intensity distribution.

5. The device according to claim 4, wherein said further lens devices are in each case embodied as cylindrical lens each having a cylinder axis oriented in the direction of the longitudinal extent of the linear intensity distribution.

6. The device according to claim 1, wherein said laser light source can emit a multi-mode laser radiation, in a case of which a beam quality factor with regard to a first direction perpendicular to the propagation direction of the laser radiation is greater than 1 and also a further beam quality factor with regard to a second direction perpendicular to the propagation direction is greater than 1.

7. The device according to claim 6, further comprising a beam transformation device disposed such that said beam transformation device can transform the laser radiation or partial beams of the laser radiation in such a way that the beam quality factor with regard to the first direction is increased and that the further beam quality factor with regard to the second direction is reduced.

8. The device according to claim 7, wherein said beam transformation device can transform the laser radiation or partial beams of the laser radiation in such a way that at least one of the beam quality factor and spatial coherence properties with regard to the first direction of the laser radiation or of each of the partial beams is interchanged with at least one of the further beam quality factor and spatial coherence properties with regard to the second direction.

9. The device according to claim 7, wherein said beam transformation device can rotate the laser radiation or the individual partial beams by an angle not equal to 0° about the propagation direction of the laser radiation.

10. The device according to claim 9, wherein said angle is 90°.

11. The device according to claim 7, wherein said beam transformation device can transform the laser radiation or the individual partial beams in such a way that a cross section of a partial beam to be transformed is converted into a cross section which appears to be mirrored with respect to the cross section of the partial beam to be transformed at a plane parallel to the propagation direction of the laser radiation.

12. The device according to claim 7, wherein said lens device is disposed downstream of said beam transformation device in the propagation direction of the laser radiation.

13. The device according to claim 7, further comprising a beam splitting device for splitting the laser radiation into a plurality of partial beams, and disposed upstream of said beam transformation device in the propagation direction of the laser radiation in such a way that they can Fourier-transform the laser radiation.

14. The device according to claim 13, wherein said beam transformation device is disposed downstream of said beam splitting device.

15. The device according to claim 13, wherein said beam splitting device contains two cylindrical lens arrays spaced apart from one another in the propagation direction of the laser radiation, said two cylindrical lens arrays each having cylindrical lenses.

16. The device according to claim 15, wherein a distance between said two cylindrical lens arrays spaced apart from one another in the propagation direction of the laser radiation corresponds to a focal length of said cylindrical lenses of a first cylindrical lens array of said two cylindrical lens any arrays.

17. The device according to claim 13, wherein said beam splitting device contains at least one cylindrical lens array.

18. The device according to claim 13, wherein said beam transformation device is disposed downstream of said beam splitting device, in an output-side Fourier plane of said beam splitting device.

19. The device according to claim 7, further comprising a beam combining device for combining the individual partial beams after the transformation by said beam transformation device.

20. The device according to claim 7, wherein in a case of the laser radiation of said laser light source before a beam transformation, the beam quality factor with regard to the first direction perpendicular to the propagation direction of the laser radiation is greater than 2, and also the further beam quality factor with regard to the second direction perpendicular to the propagation direction is greater than 2.

21. The device according to claim 7, wherein in a case of the laser radiation of said laser light source before a beam transformation, the beam quality factor with regard to the first direction perpendicular to the propagation direction of the laser radiation is at most ten times as large as the further beam quality factor with regard to the second direction perpendicular to the propagation direction.

22. The device according to claim 7, wherein in a case of the laser radiation of the laser light source before the beam transformation, the beam quality factor with regard to the first direction perpendicular to the propagation direction of the laser radiation is equal to the further beam quality factor with regard to the second direction perpendicular to the propagation direction.

23. The device according to claim 7, wherein in a case of the laser radiation of said laser light source before a beam transformation, the beam quality factor with regard to the first direction perpendicular to the propagation direction of the laser radiation is greater than 4, and also the further beam quality factor with regard to the second direction perpendicular to the propagation direction is greater than 4.

24. The device according to claim 7, wherein in a case of the laser radiation of said laser light source before a beam transformation, the beam quality factor with regard to the first direction perpendicular to the propagation direction of the laser radiation is greater than 6, and also the further beam quality factor with regard to the second direction perpendicular to the propagation direction is greater than 6.

25. The device according to claim 7, wherein in a case of the laser radiation of said laser light source before a beam transformation, the beam quality factor with regard to the first direction perpendicular to the propagation direction of the laser radiation is at most five times as large as the further beam quality factor with regard to the second direction perpendicular to the propagation direction.

26. The device according to claim 7, wherein in a case of the laser radiation of said laser light source before a beam transformation, the beam quality factor with regard to the first direction perpendicular to the propagation direction of the laser radiation is at most twice as large as the further beam quality factor with regard to the second direction perpendicular to the propagation direction.

27. The device according to claim 1, further comprising a homogenizing device for homogenizing the laser radiation.

28. The device according to claim 1, wherein said laser light source is not embodied as a semiconductor laser.

29. The device according to claim 1, wherein said laser light source is selected from the group consisting of Nd-YAG lasers and excimer lasers.

30. The device according to claim 1, wherein said lens device can be moved in the propagation direction of the laser radiation.

* * * * *

UNITED STATES PATENT AND TRADEMARK OFFICE
CERTIFICATE OF CORRECTION

PATENT NO. : 8,270,084 B2
APPLICATION NO. : 12/745600
DATED : September 18, 2012
INVENTOR(S) : Iouri Mikliaev It is certified that error appears in the above-identified patent and that said Letters Patent is hereby corrected as shown below:

Title Page Item [73] should read as follows:

LIMO Patentverwaltung GmbH & Co. KG, Dortmund (DE)

Signed and Sealed this
Twenty-second Day of January, 2013

David J. Kappos
*Director of the United States Patent and Trademark Office*